UNITED STATES PATENT OFFICE.

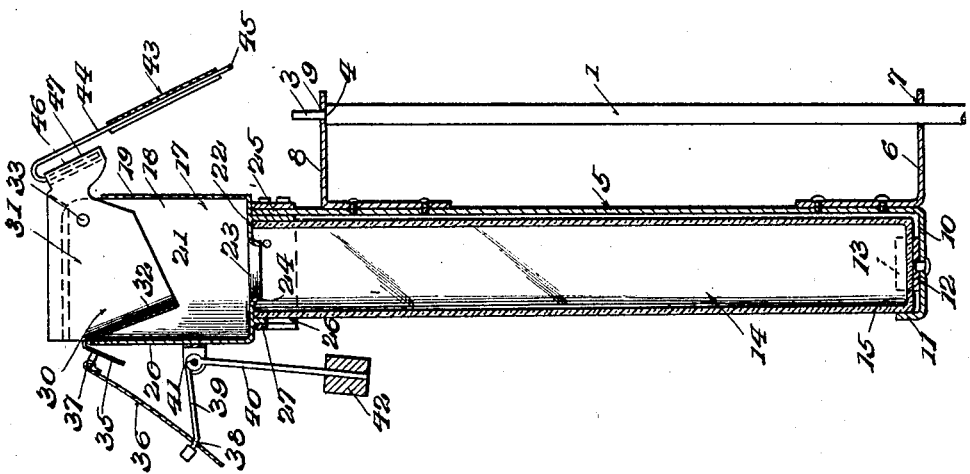

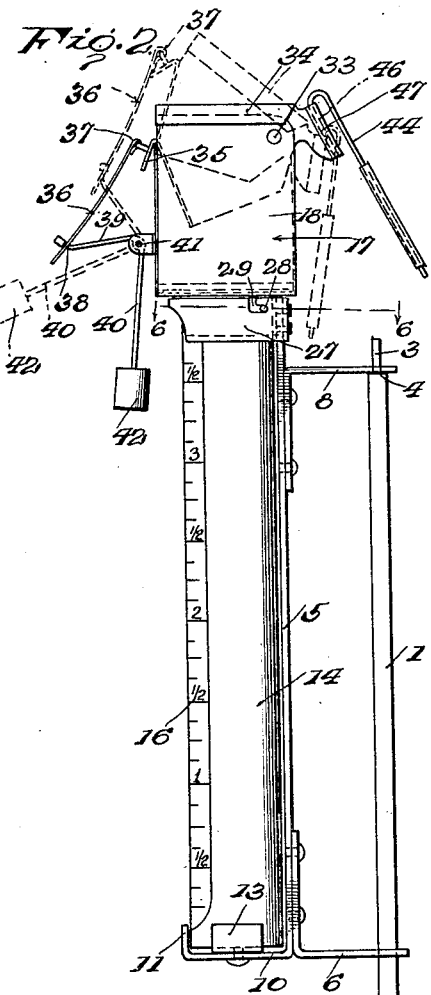

THOMAS J. JOHNSON, OF NORMAN, OKLAHOMA.

RAIN GAUGE.

1,407,068.   Specification of Letters Patent.   Patented Feb. 21, 1922.

Application filed April 1, 1920. Serial No. 370,546.

*To all whom it may concern:*

Be it known that I, THOMAS J. JOHNSON, a citizen of the United States, residing at Norman, in the county of Cleveland and State of Oklahoma, have invented certain new and useful Improvements in Rain Gauges, of which the following is a specification.

This invention relates to rain gauges and has as its primary object to provide a rain gauge by the employment of which the amount of rain falling in a column of given dimensions may be accurately measured. It is therefore an object of the present invention to provide a rain gauge so constructed and operating automatically in such a manner that the mouth of its receiver will at all times be held in position substantially perpendicular to the direction of rainfall so as to collect a full volume of the rain whether the rainfall be perpendicular to the earth's surface or at an oblique angle.

More specifically the invention has as its object the provision of a rain gauge the receiver of which is provided with a tiltable mouth the tilting movement of which is automatically influenced and controlled by the wind pressure.

Another object of the invention is to provide means for resisting the tilting movement of the mouth with force in ratio to the wind pressure so that while the devices will readily respond to variations in the wind pressure, a greater resistance will be offered to the tilting movement of the mouth of the receiver as the wind pressure or velocity increases.

Another object of the invention is to so construct the gauge that not only will the mouth of its receiver be automatically tilted to position substantially directly facing the descending rain, but provision is also made for automatically changing the position of the receiver in accordance with variations in the direction of the wind.

A further object of the invention is to so construct the device that the receptacle or reservoir thereof may be readily removed and emptied of its contents, and the parts of the instrument otherwise readily disassembled and reassembled whenever desired.

In the accompanying drawings:

Figure 1 is a perspective view of the rain gauge in use;

Fig. 2 is a side elevation thereof, the mouth of the receiver being illustrated in full lines in normal position and in dotted lines in tilted position;

Fig. 3 is a rear elevation of the instrument;

Fig. 4 is a front elevation thereof;

Fig. 5 is a vertical longitudinal sectional view therethrough;

Fig. 6 is a horizontal sectional view on the line 6—6 of Fig. 2.

In the drawings the numeral 1 indicates an upright or standard which is provided preferably with a pointed lower end 2 which may be driven into the ground as shown in Fig. 1 of the drawings, the upper end of the upright being reduced in diameter as indicated by the numeral 3, and by thus reducing the said end of the upright a shoulder 4 is formed. The numeral 5 indicates in general a frame which is to support the gauge proper and which is to be mounted, as will now be explained, upon the upright 1 so as to have free swinging movement about the said upright. At its lower end the frame is provided with an outstanding bracket 6 having an opening 7 through which the upright 1 loosely extends, and near its upper end the frame is provided with a similar outstanding bracket 8 having an opening 9 through which the reduced end 3 of the upright projects, the lower side of the bracket 8 resting upon the shoulder 4 and by reason of such engagement serving to support the frame against downward movement upon the upright. The frame 5 preferably comprises a bar of metal to which the brackets 6 and 8 are riveted or otherwise secured, and the lower end portion of this bar is bent laterally to project in a direction the opposite to that in which the bracket 6 projects, as indicated by the numeral 10, the extremity of this portion being bent upwardly as at 11. A cross piece 12 is riveted or otherwise secured to the portion 10 and has its extremities bent upwardly as at 13 so that the portions 11 and 13 together with the lower portion of the bar of the frame at the juncture of the portion 10 therewith, form in effect a pocket or seat to receive the lower end of the reservoir or gauge tube of the instrument which tube is indicated in general by the numeral 14 and is open at its top and provided at its lower end with a closed bottom 15. The tube 14 throughout its length is provided with a suitable scale 16 which may for example be graduated to represent inches and tenths of inches. However, the graduations of this scale are not equivalent to the measurements which they are intended to represent for the tube 14 will be of smaller diameter than the receiver of the instrument, to be presently described, so that a volume of rain water which would fill the receiver to a depth of one inch for example will fill the tube to a much greater depth, and it will be understood that the parts are thus proportioned so that greater accuracy may be obtained in measuring fractions of inches. It is preferable that the tube 14 be of glass although it may be constructed of other material or partly of one material and partly of another, if desired.

The receiver of the instrument is indicated in general by the numeral 17 and the body of the receiver, indicated by the numeral 18, is preferably in the nature of a hollow rectangular receptacle having a front wall 19, a rear wall 20, side walls 21, and a bottom 22 which latter is provided centrally with a drain or discharge opening 23 and with a depending flange or apron 24 which surrounds this opening and projects downwardly within the upper end of the gauge tube or reservoir 14 when the parts of the instrument are assembled. The receiver 17 is provided upon the under side of its bottom 22 with a depending annular neck 25 which surrounds and is concentric to the wall of the opening 23 and this neck, if desired may be cut away at one side as indicated by the numeral 26 so as to expose the extreme upper portion of the scale 16. By reference to Figs. 5 and 6 of the drawings it will be observed that the upper end of the gauge tube 14 fits more or less snugly within the neck 25 of the receiver 17 when these parts as assembled. The numeral 27 indicates a collar which is supported rigidly at the upper end of the bar of the frame 5 in vertical alignment above the seat comprising the parts 10, 11, 12 and 13 heretofore referred to. Interiorly this collar is of a diameter to snugly and yet rotatably and removably receive the neck 25 and the said neck is provided with an outstanding stud 28 which is engageable in a bayonet slot 29 formed in the collar so that upon inserting the flange into the collar in a manner to engage the stud in the slot and then relatively rotating the parts, the receiver may be locked in assembled relation with the collar of the frame of the instrument and as the lower end of the gauge tube is seated in the stepped bar heretofore described and the upper end of the said tube seats within the neck 25, the said tube likewise will be held securely in position. However, it will be evident that by rotating the neck 25 within the collar and disengaging the stud from the slot, the parts may be disassembled so as to permit of removal of the tube whenever it becomes necessary or desirable to empty the same of its contents.

The mouth of the receiver is indicated in general by the numeral 30 and the same comprises spaced sides 31 and a rear wall 32 which extends between the side walls 31. The said mouth is proportioned to fit within the open upper end of the body 18 of the receiver and is pivoted at its forward end for tilting movement, upon studs 33 which project inwardly from the side walls 21 of the body of the receiver at the upper forward corners thereof and through openings in the side walls 31 of the said mouth. By a means which will presently be described, the mouth of the receiver normally occupies such a position that its open upper side will be horizontally disposed or, in other words, will be located in a plane parallel to the bottom 22 of the receiver body and in this position of the mouth, side flanges 34 which are formed at the upper edges of the side walls 31 of the mouth are designed to engage or fit over the upper edges of the side walls 21 of the body of the receiver, and a similar flange 35 formed at the upper edge of the rear wall 32 of the mouth is designed to engage or fit over the upper edge of the rear wall 20 of the body of the receiver as clearly shown in Fig. 5.

In order that the mouth of the receiver may be normally held in the position stated, a link 36 is pivotally connected as at 37 to the flange 35 and at its lower end is pivotally engaged as at 38 with the rear end of one arm 39 of an angle lever, the other arm of which lever is indicated by the numeral 40. This lever is pivotally mounted at the juncture of its arms as at 41 upon the rear side of the wall 20 of the receiver body and a weight 42 is fixed at the lower end of the arm 40 and by gravity normally holds the angle lever in the full line position shown in Figs. 2 and 5 of the drawings. It will be understood at this point that tilting movement of the mouth of the receiver is yieldably resisted by the weight 42 through the connections provided between it and the said mouth and that as the mouth is tilted upwardly and forwardly as illustrated in dotted lines in Fig. 2, the link 36 will pull upon the arm 39 of the angle lever so as to correspondingly rock the said lever and, of course, as the arm 40 of the said lever more nearly approaches the horizontal, the weight 42 will offer increasing resistance to the tilting movement of the receiver mouth.

The numeral 43 indicates a vane preferably in the nature of a sheet of material secured at its edges about the spaced arms 44 of a frame, these arms being connected at their lower ends by a cross piece 45 and having their upper ends bent over upon themselves as at 46 and seated in suitable sockets 47 formed at the forward corners of the side walls 31 of the receiver mouth and located forwardly beyond the pivots 33.

From the foregoing description of the invention it will be understood that where rainfall is unattended by wind, the mouth of the receiver will occupy substantially the normal position shown in Figs. 2 and 5 of the drawings and as the rainfall under such conditions will be vertical, the receiver will catch a full volume of the rain. Where the rainfall is attended by wind, the instrument as a whole will, of course, swing about its supporting standard to face the wind so that its vane 43 will be presented to the wind and because of the wind pressure against this vane, the same will be swung inwardly to a greater or less distance, thus correspondingly tilting the mouth of the receiver so as to insure of a full catch of the falling rain.

Having thus described the invention, what is claimed as new is:

1. In a rain gauge, a receiver having a mouth tiltable with relation to the body thereof, and wind pressure controlled means for tilting the said mouth.

2. In a rain gauge, a receiver having a mouth mounted for tilting movement, and a wind pressure vane operatively connected with the mouth.

3. In a rain gauge, a receiver having a mouth comprising side walls pivotally supported for tilting movement and a connecting wall, and a vane supported by the mouth at its side opposite the said connecting wall.

4. In a rain gauge, a receiver having a mouth, wind pressure controlled means for automatically presenting the said mouth directly to the rainfall, and means yieldably resisting such movement of the mouth.

5. In a rain gauge, a receiver having a tiltable mouth, means yieldably resisting tilting movement of the mouth, and wind pressure controlled means for tilting the said receiver mouth.

6. In a rain gauge, a receiver having a mouth comprising side walls and a connecting wall, means pivotally connecting the side walls of the mouth with the receiver, means coacting with the receiver mouth for yieldably resisting pivotal movement thereof, and wind pressure controlled means for automatically moving the mouth against the influence of the last mentioned means.

7. In a rain gauge, a receiver comprising a body open at its top, a mouth having an open side and mounted at its said side for tilting movement within the open top of the receiver, the opposite side of the mouth being closed, and wind pressure controlled means for automatically tilting the said mouth to present the same substantially directly to the rainfall.

8. In a rain gauge, a support, a reservoir mounted for free swinging movement about the support, a receiver arranged to discharge into the reservoir and having a mouth tiltable with relation to the body thereof, and wind pressure controlled means for automatically influencing swinging movement of the assemblage to breast the wind and for automatically tilting the mouth to present the same substantially directly to the rainfall.

9. In a rain gauge, a tubular reservoir, means for supporting the said reservoir including a collar surrounding the upper end of the reservoir, a receiver having a neck removably fitted to the upper end of the reservoir and seating within the collar, and coacting means upon the said neck and collar for separably connecting the same.

10. In a rain gauge, a receiver having a mouth, wind pressure controlled means for automatically presenting the said mouth substantially directly to the rainfall, and means yieldably resisting such movement of the mouth in increasing degree in ratio to the wind pressure exerted thereagainst.

In testimony whereof I affix my signature.

THOMAS J. JOHNSON. [L. S.]